No. 652,281. Patented June 26, 1900.
J. M. MacLULICH.
MANUFACTURE OF RESILIENT TIRES.
(Application filed June 22, 1898.)
(No Model.) 3 Sheets—Sheet 2.
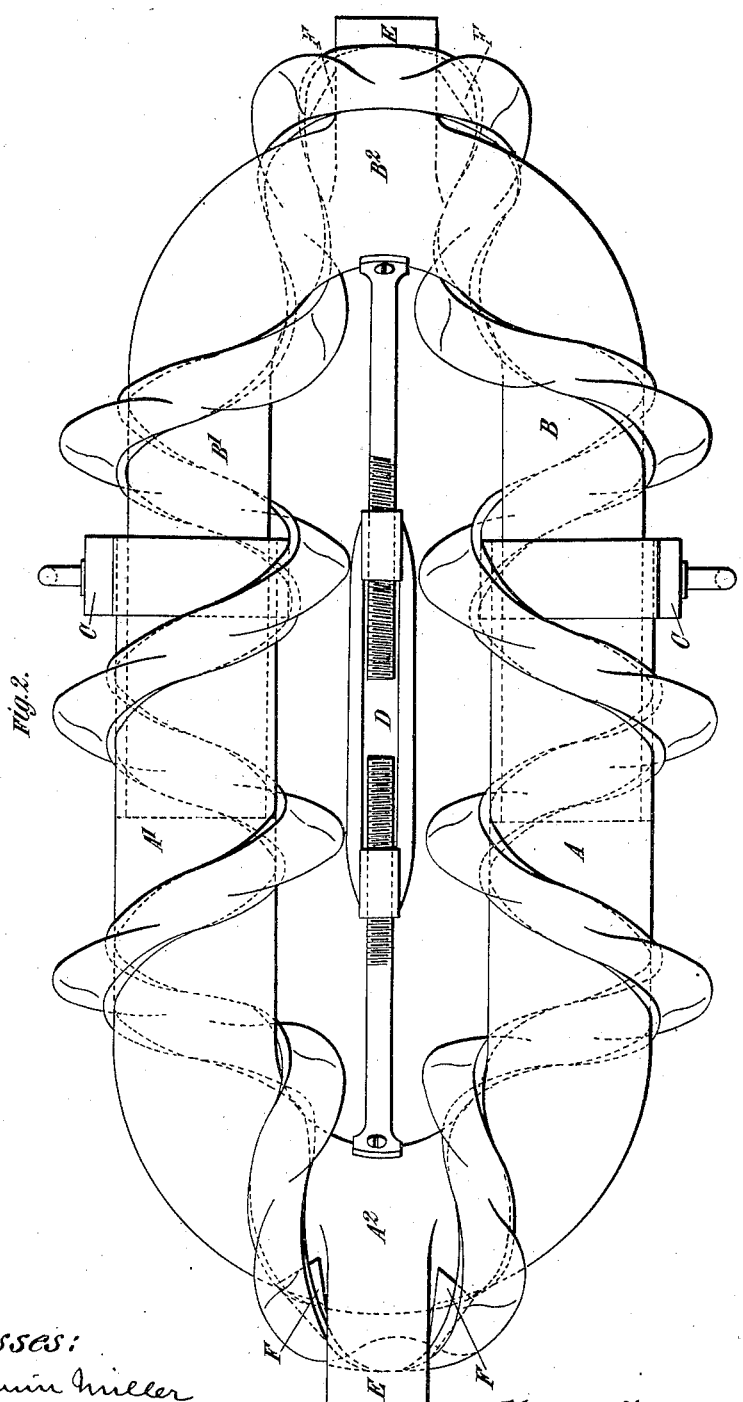

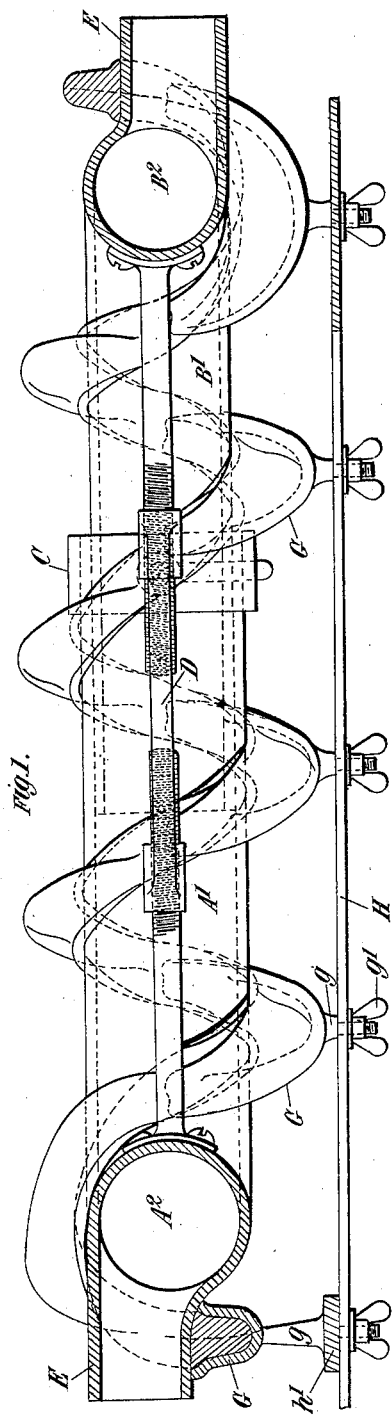

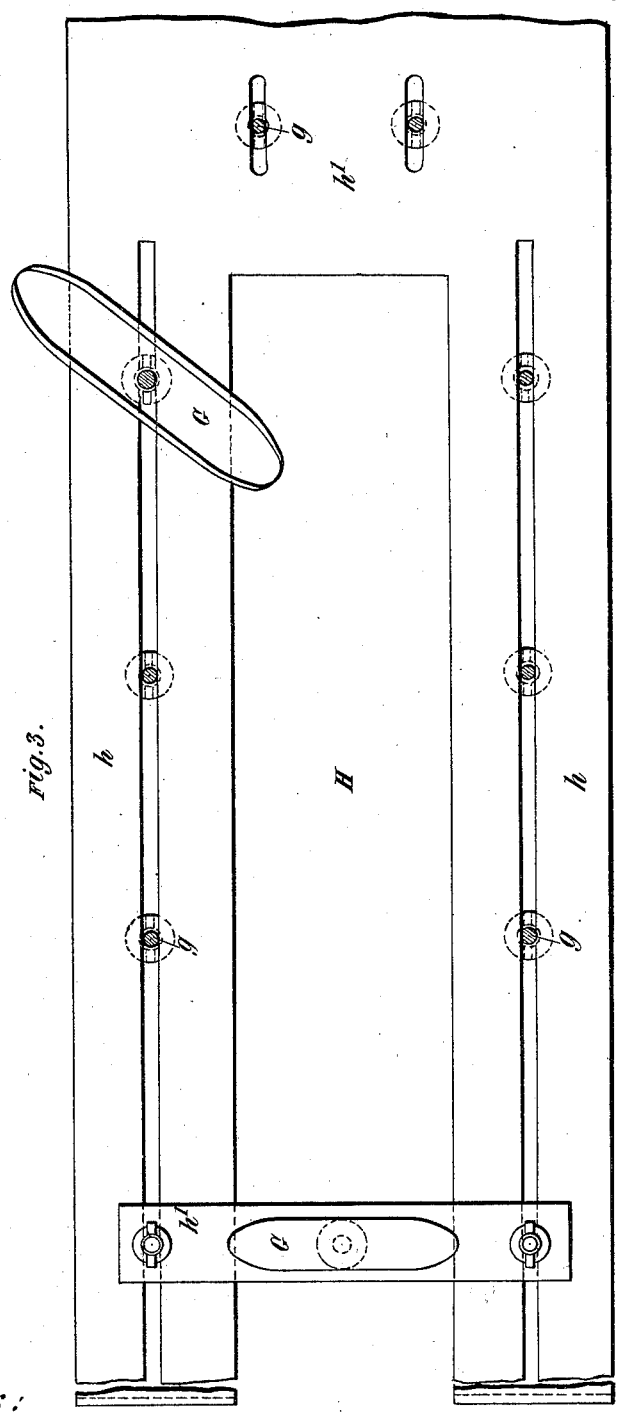

UNITED STATES PATENT OFFICE.

JAMES MECREDY MacLULICH, OF DUNDRUM, IRELAND.

MANUFACTURE OF RESILIENT TIRES.

SPECIFICATION forming part of Letters Patent No. 652,281, dated June 26, 1900.

Application filed June 22, 1898. Serial No. 684,146. (No model.)

*To all whom it may concern:*

Be it known that I, JAMES MECREDY MAC-LULICH, gentleman, a subject of the Queen of Great Britain, residing at Gortmore, Dundrum, in the county of Dublin, Ireland, have invented certain new and useful Improvements in and Relating to the Manufacture of Resilient Tires and Tire-Covers, of which the following is a specification.

This invention relates to resilient tires or tire-covers of the kind or class that are constructed in such a manner that the outer or peripheral portion of the rubber or other material forming such tires is in a state of compression, and thus offers great resistance to wear and abrasion. Tires of this kind have been manufactured by molding or vulcanizing them in the form of a coil having a diameter of less magnitude than that of the wheels to which the finished tires are to be applied, such tires being provided or not with an inextensible backing or lining either on the smallest circumference or embedded in the rubber. A very great disadvantage in such tires as heretofore manufactured is that it is necessary to have a joint—that is to say, an endless tire cannot be formed for the reason that if after the proper number of convolutions of the coil have been formed the ends were brought together and joined in vulcanizing the tire would when opened out be twisted and therefore useless.

Now the object of my invention is to overcome this disadvantage and to provide an endless and practically-jointless tire having its outer portion in a state of compression.

According to my invention I so bend, coil, or loop the tire prior to the vulcanization thereof that cross-twists or twists in contrary directions are produced therein, so that twists in one direction neutralize or compensate for those in the other direction, and the tire when opened out will present an untwisted jointless or endless band or strip, having its peripheral portion in a state of strong compression. I may effect the production of the mutually-neutralizing twists by arranging the tire in coils upon a ring-shaped or other endless mandrel, arranging some of the coils or convolutions in a left-hand direction and others in a right-hand direction.

In order that my invention may be clearly understood and readily carried into effect, I will proceed to describe the same more fully with reference to the accompanying drawings, which illustrate, by way of example, one method of carrying my invention into effect, and in which—

Figures 1 and 2 are respectively a sectional elevation and a plan of an endless mandrel upon which a tire may be vulcanized, showing an endless tire arranged thereon in two series of coils; and Fig. 3 is a separate plan view of the device I prefer to employ for supporting the tire upon the said mandrel during the process of vulcanization.

The mandrel consists of two parallel telescopic portions A B A' B', joined at their extremities by connecting-pieces, such as the semicircular segments $A^2 B^2$, thus forming a flattened ring, as it were, capable of being adjusted to various sizes by sliding the telescopic portions into or out of each other. By this means my improved apparatus is adapted for use in the manufacture of tires of various sizes. Clips C C or other suitable devices are provided at the extremites of the outer telescopic members for the purpose of securing the said members in position after adjustment.

Instead of the semicircular segments $A^2 B^2$ straight connecting-pieces may be employed, thus forming a square or oblong endless mandrel, or connecting-pieces of any other shape may be used. A previously-formed endless tire is wound upon the mandrel in the manner illustrated in the drawings, and is vulcanized thereon in this position. The twists due to the coils upon the portion A B of the mandrel are neutralized or compensated for by those due to the coils on the portion A' B', so that no total twist is produced by the helical arrangement of the tire.

I may provide an adjustable strut or stretcher device D, adapted to maintain the separation of the two parts A A' B B' of the mandrel and resist the tendency of the tire to draw the said parts together. This strut is removable for the purpose of placing the tire on the mandrel and removing it therefrom.

In order to preserve the uniformity of the compression at the places where the coils change from one direction to the other, short tubular arms or projections E are formed on the mandrel, over which projections the tire is passed in the manner shown. These projections may be arranged to swivel or to be depressible for the purpose of facilitating the removal of the tire from the mandrel after it has been vulcanized thereon. Plates or bridge-pieces F are arranged at the angles or corners formed by the junctions of these projections E and the main portion of the mandrel, so as to afford a suitable bed or rest for the tire, and in the case of straight connecting-pieces being employed in place of the curved pieces $A^2$ $B^2$ similar plates or bridge-pieces may be arranged in the angles or corners formed between such connecting-pieces and the telescopic members of the mandrel.

Obviously instead of changing the direction of the coils at the ends of the double mandrel I may cause such direction to be changed at a point about midway of the straight portions, and in such case the aforesaid clips C may, if desired, be arranged to form an arm or projection for carrying the looped portion of the tire where the direction of the coils is changed and to constitute the aforesaid means for preserving the uniformity of the compression. Moreover, instead of arranging the tire in two series of coils I may arrange it in four or any even number of series, it being only necessary that the number of convolutions or coils in each direction be equal.

For the purpose of supporting the tire during the process of vulcanization I provide cups G, adapted to fit the lower half of each coil. (See Figs. 1 and 3.) These cups are adjustably mounted on a slotted plate or table H, consisting of two longitudinal portions $h$ $h$ and two transverse portions $h'$ $h'$, one of which latter, as shown, is longitudinally adjustable. Each cup is mounted on a screw-threaded stem $g$, adapted to pass through the slot in the table and to be secured in any desired position by the butterfly-nut $g'$. By these means the supporting-cups may be adjusted to any position or inclination according to the diameter of the tire that may be wound upon the mandrel and to the number and inclination of its convolutions. I may, however, employ other means for supporting the tire, such as cups or molds suspended from the mandrel itself or from the strut D.

Although I have described only one method of carrying my invention into effect, it is obvious that I may attain my object in other ways. For example, instead of disposing the tire in series of coils or convolutions I may dispose it in a series of bends, loops, or partial convolutions, which may be formed upon projections on an endless mandrel or on a sphere, suitable plates or bridge-pieces, such as the hereinbefore-described plates F, being employed to constitute a bed or rest for the tire, or a strip or plate or a mold bent into the requisite form may be employed without a mandrel, sphere, or the like, for the purpose of retaining the tire in the desired coils, loops, or bends during the vulcanization thereof, these coils, loops, or bends being in all cases so disposed relatively to each other that any twist that may be caused by some portions thereof will be neutralized or compensated for by cross-twists or twists in other portions, as already explained. Obviously, also, although I have described my invention as applied to a solid tire, such as would be suitable for carriage-wheels, it is equally applicable to other forms of tire or to covers for pneumatic and other tires and wheels, and any suitable form of mold may be employed in connection therewith.

It is to be understood that the annexed drawings are merely diagrammatic illustrations of the essential features of my invention, and that in practice the coils in which the tire is arranged might be closer together and of less diameter than those shown.

What I claim is—

1. A method of manufacturing a resilient endless or jointless tire or tire-cover with a compressed tread, consisting in bending, coiling or looping the tire on a suitable surface in such manner that compensating or neutralizing cross-twists, or twists in contrary directions, are produced and then vulcanizing such tire while so bent, coiled or looped, substantially as and for the purpose described.

2. In the manufacture of an endless tire or tire-cover, a surface on which such tire is adapted to be mounted during the vulcanization thereof, consisting of an endless series of curves so arranged that the tire is not curved continuously in the same sense, but is curved partly in one direction and partly in another so that any twist produced by one part will be neutralized by that produced by the other part, substantially as described.

3. In the manufacture of an endless tire or tire-cover a surface on which said tire is adapted to be mounted and retained during the vulcanization process, comprising an endless mandrel, and projections on such mandrel over which the tire may be looped to change the direction of its curves or coils, substantially as and for the purposes described.

4. In the manufacture of an endless tire or tire-cover a surface on which said tire is adapted to be mounted and retained during the vulcanization process, comprising an endless mandrel formed in two portions connected together by telescopic members, clips for securing such members after adjustment, projections on such mandrel over which the tire may be looped to change the direction of its curves or coils, and an adjustable strut for maintaining the mandrel in position when the tire is mounted thereon, substantially as described.

5. In the manufacture of an endless tire or tire-cover a surface on which said tire is adapted to be mounted and retained during the vulcanization process, comprising an endless mandrel, projections on such mandrel over which the tire may be looped to change the direction of its curves or coils, and molds or cups for supporting the tire at the lower portions of the curves or coils thereof, substantially as described.

6. A tire or tire-cover of elastic material, endless and without joints, and having its outer or peripheral portion in a state of longitudinal compression, as set forth.

In testimony whereof I have hereunto set my hand, in presence of two subscribing witnesses, this 24th day of May, 1898.

JAMES MECREDY MacLULICH.

Witnesses:
H. ASHBY NORRIS,
FRED. C. HARRIS.